United States Patent
Hall et al.

(10) Patent No.: US 11,873,240 B2
(45) Date of Patent: Jan. 16, 2024

(54) METHODS AND SYSTEMS FOR SIZING WASTE SOLIDS

(71) Applicant: Hall Labs LLC, Provo, UT (US)

(72) Inventors: David Hall, Provo, UT (US); Michael Hall, Provo, UT (US); Cody Rees, Provo, UT (US); Thomas Corie, Springville, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 1130 days.

(21) Appl. No.: 16/457,907

(22) Filed: Jun. 28, 2019

(65) Prior Publication Data

US 2020/0406268 A1 Dec. 31, 2020

(51) Int. Cl.
| | |
|---|---|
| *C02F 11/06* | (2006.01) |
| *B02C 19/00* | (2006.01) |
| *B02C 23/36* | (2006.01) |
| *B02C 23/10* | (2006.01) |
| *B02C 4/02* | (2006.01) |
| *C02F 11/122* | (2019.01) |
| *C02F 11/10* | (2006.01) |
| *B02C 23/12* | (2006.01) |
| *B02C 18/16* | (2006.01) |
| *B02C 18/14* | (2006.01) |
| *B02C 25/00* | (2006.01) |
| *C02F 103/00* | (2006.01) |
| *C02F 1/10* | (2023.01) |

(52) U.S. Cl.
CPC ............... *C02F 11/06* (2013.01); *B02C 4/02* (2013.01); *B02C 18/142* (2013.01); *B02C 18/16* (2013.01); *B02C 19/0056* (2013.01); *B02C 23/10* (2013.01); *B02C 23/12* (2013.01); *B02C 23/36* (2013.01); *B02C 25/00* (2013.01); *C02F 1/10* (2013.01); *C02F 11/122* (2013.01); *B02C 2201/063* (2013.01); *C02F 2103/005* (2013.01); *C02F 2303/26* (2013.01); *Y02W 10/40* (2015.05)

(58) Field of Classification Search
None
See application file for complete search history.

(56) References Cited

U.S. PATENT DOCUMENTS

| | | | | |
|---|---|---|---|---|
| 2,105,759 | A * | 1/1938 | Stevenson | B02C 18/0092 241/82 |
| 3,529,779 | A * | 9/1970 | Gorman | B02C 18/0092 241/38 |
| 2010/0308143 | A1* | 12/2010 | Mancuso | B02C 18/0092 241/60 |
| 2018/0186670 | A1* | 7/2018 | Philpott | B02C 23/12 |

FOREIGN PATENT DOCUMENTS

WO WO-0059636 A1 * 10/2000 ............... A23G 1/12

* cited by examiner

*Primary Examiner* — Krishnan S Menon

(57) ABSTRACT

Methods and systems for reducing an average particle size of blackwater solids is disclosed. A vessel is configured to receive a blackwater stream through a one-way inlet. The one-way inlet is configured to allow the blackwater stream into the vessel and prevent backflow. The blackwater stream contains blackwater solids and water. A device in a bottom portion of the vessel is configured to receive the blackwater and comminute the blackwater solids. A recirculating pump is configured to recirculate the blackwater stream under pressure through the device until the average particle size of the blackwater solids is reduced below a size threshold, resulting in a sized blackwater stream.

19 Claims, 5 Drawing Sheets

METHODS AND SYSTEMS FOR SIZING WASTE SOLIDS

TECHNICAL FIELD

The systems and methods described herein relate generally to waste treatment and more particularly to the sizing of waste solids.

BACKGROUND

Waste streams, especially blackwater streams, require careful treatment. On a large scale, traditional bioreactors and sludge treatment is capable of handling this material. On a small scale, such as in recreational vehicles, blackwater is typically an annoyance at best and a significant hurdle at worst. Other small scale blackwater producers include remote work sites, remote cabins, and small villages in developing nations. Traditional treatment methods are typically too large in scale or too impractical to implement for a single recreational vehicle, remote work site, or cabin. Simplifying the handling of waste solids, especially blackwater solids, is required.

SUMMARY

In a first aspect, the disclosure provides a system for reducing an average particle size of waste solids in a waste stream, such as blackwater. A vessel is configured to receive a waste stream through a one-way inlet. The one-way inlet is configured to allow the waste stream into the vessel and to prevent backflow. The waste stream contains waste solids and water. A device in a bottom portion of the vessel is configured to receive the waste stream and comminute the waste solids. A recirculating pump is configured to recirculate the waste stream under pressure through the device until the average particle size of the waste solids is reduced below a size threshold, resulting in a treated waste stream with sized waste solids.

In a second aspect, the disclosure provides a method for reducing an average particle size of waste solids in a waste stream, such as blackwater. A waste stream is passed into a vessel through a one-way inlet. The one-way inlet allows the waste stream into the vessel and prevents backflow. The waste stream contains waste solids and water. The waste solids are comminuted through a device in a bottom portion of the vessel. The waste stream is recirculated through a recirculating pump under pressure through the device until the average particle size of the waste solids is reduced below a size threshold, resulting in a treated waste stream with sized waste solids.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 2:
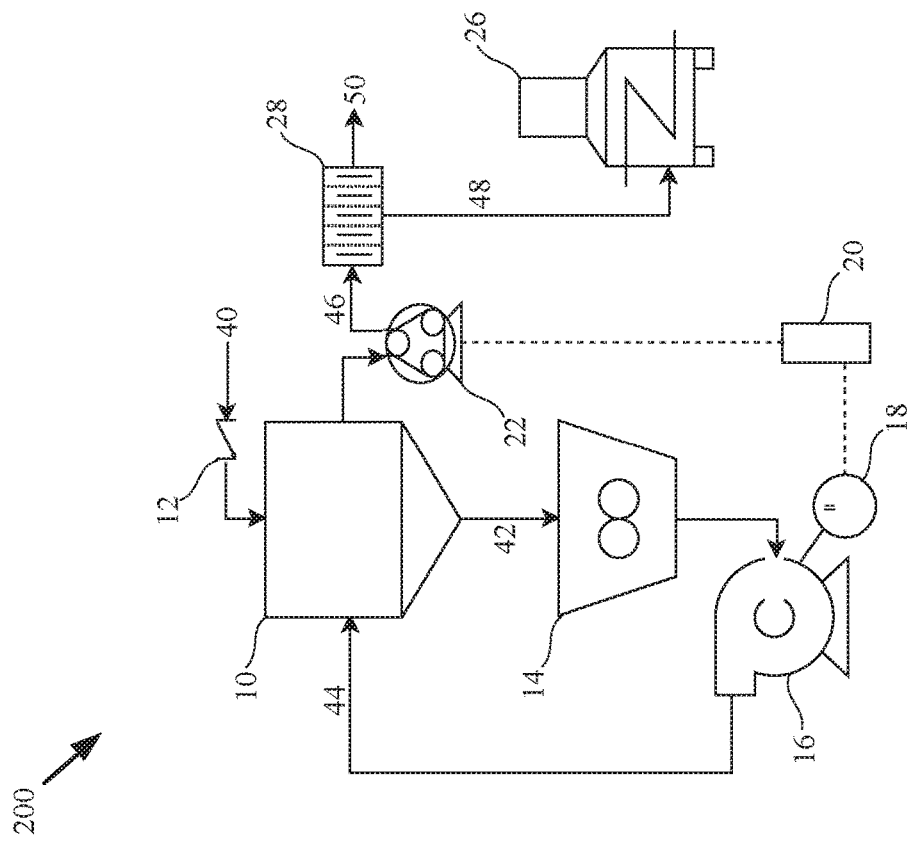
FIG. 2 is a block diagram of a system for reducing an average particle size of blackwater solids and incinerating sized blackwater solids.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "sizing," or "sized," are terms of comminution. Solids are "sized" or "comminuted" when they are crushed, ground, shredded, pulverized, macerated, or otherwise reduced in size to a desired particle size.

As used herein, a "comminuting device" is meant to refer to any sizing machine such as grinding rolls, grinders, mills, shredders, macerators, crushers, and pulverizers.

As used herein, the term "blackwater" is intended to have a relatively broad meaning, referring to a waste stream comprising waste solids, such as feces, paper products, and sanitary products, as well as water and urine, typically from a toilet.

The small-scale waste stream producer is typically underserved in industry. Small-scale waste stream producers, including recreational vehicles, remote work sites, third-world villages, and remote cabins, typically cannot afford expensive waste treatment systems. Blackwater, consisting of components selected from the group consisting of water, urea, fecal matter, paper products, hygiene products, and combinations thereof, is the most typical waste stream envisioned, but other waste streams, such as food waste, may be treated by the methods and systems described herein. The disclosed invention, as related to recreational vehicles, can be used as part of a "Never Dump/Never Fill" philosophy for recreational vehicles. Recreational vehicle users typically dread the dumping part of recreational vehicle usage. As a part of the "Never Dump" philosophy, the inventions disclosed describe systems and methods for waste solids sizing that allow for waste disposal without user involvement, eliminating dumping.

In a preferred embodiment, the waste streams are those of a small-scale waste stream producer. The waste stream is passed through a one-way inlet into a vessel. The waste stream is then driven through a device that comminutes the waste solids and into a pump that recirculates the waste stream under pressure and through the device until the average particle size of the waste solids is reduced below a size threshold.

Figure 1:
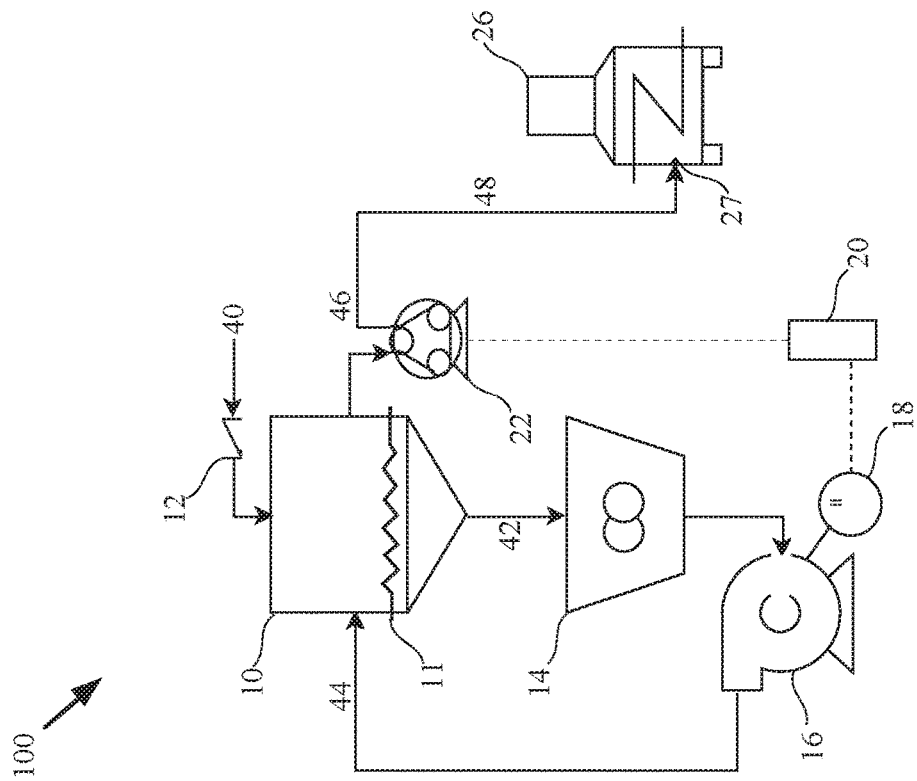
FIG. 1 is a block diagram of a system for reducing an average particle size of blackwater solids and incinerating sized blackwater solids.

FIG. 1 is a block diagram of a system for reducing an average particle size of blackwater solids and incinerating sized blackwater solids at 100, that may be used in one embodiment of the present invention. In this embodiment, the waste stream to be treated is a blackwater stream. The blackwater stream has a liquid component consisting of water and urea. The blackwater stream has a solids component consisting of fecal matter, paper products, and hygiene products. The blackwater stream 40 passes through a check valve 12 that prevents backflow and into a vessel 10. The vessel 10 has a shredder 14 in a bottom portion that shreds the solids component into smaller particles. The partially-shredded blackwater stream 44 is pumped by pump 16 back into the vessel 10, the blackwater stream 42 is thereby forced by pressure through the shredder 14. The vessel has a preheater 11 that preheats the blackwater stream 42 in preparation for the incinerator 26. The pump 16 is equipped with an amp meter 18 that detects the current draw of pump 16 and transmits the current draw to a controller 20. The controller 20 determines when the particle size of the solids component is below a size threshold by a drop in the current draw. At this point, the controller 20 transmits a signal to a peristaltic pump 22 to pump the sized blackwater stream 46 through a nozzle 27 and into an incinerator 26 where the liquids component is vaporized and the solids component is incinerated. The size of the opening in the nozzle 27 determines the size threshold the shredder 14 needs to shred the solids component below. The size threshold is low enough to allow the sized solids component to spray through the nozzle with the liquids component. In some embodiments, the peristaltic pump is replaced with a positive displacement pump.

FIG. 2 is a block diagram of a system for reducing an average particle size of blackwater solids and incinerating sized blackwater solids at 200, that may be used in one embodiment of the present invention. A waste stream 40 passes through a check valve 12 that prevents backflow and into a vessel 10. The waste stream has a solids component and a liquids component. The vessel 10 has a grinder 14 in a bottom portion that grinds the solids component into smaller particles. The partially ground blackwater stream 44 is pumped by pump 16 back into the vessel 10, the blackwater stream 42 is thereby forced by pressure through the grinder 14. The pump 16 is equipped with an amp meter 18 that detects the current draw of pump 16 and transmits the current draw to a controller 20. The controller 20 determines when the particle size of the solids component is below a size threshold by a drop in the current draw. At this point, the controller 20 transmits a signal to a peristaltic pump 22 to pump the sized blackwater stream 46 through a filter press 28. The filter press 28 separates the liquid stream 50 and the solids stream 48. The solids stream is conveyed into an incinerator 26 where it is incinerated.

Figure 3:
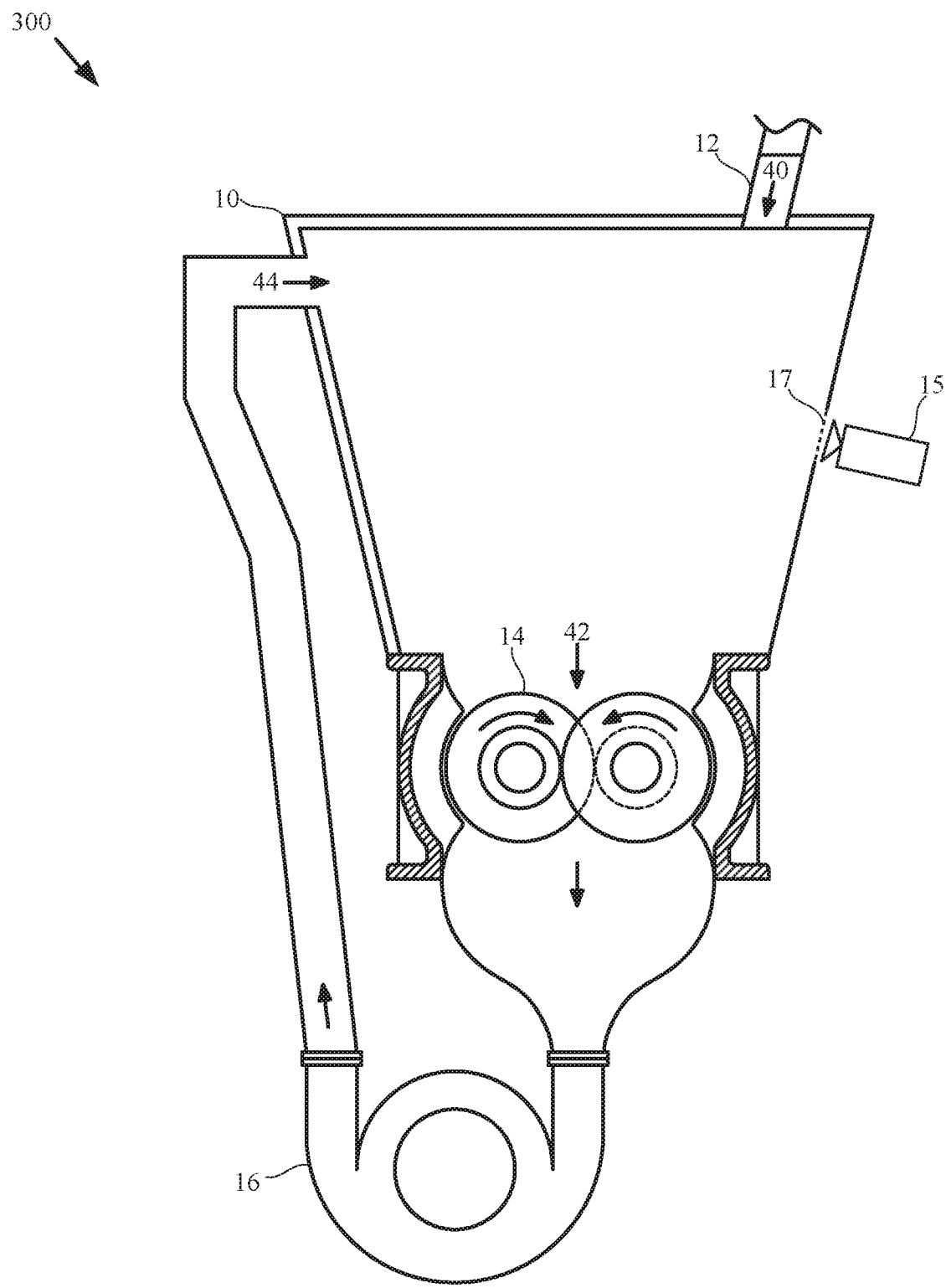
FIG. 3 is a cross-sectional elevation view of a vessel with a shredder.
Figure 4:
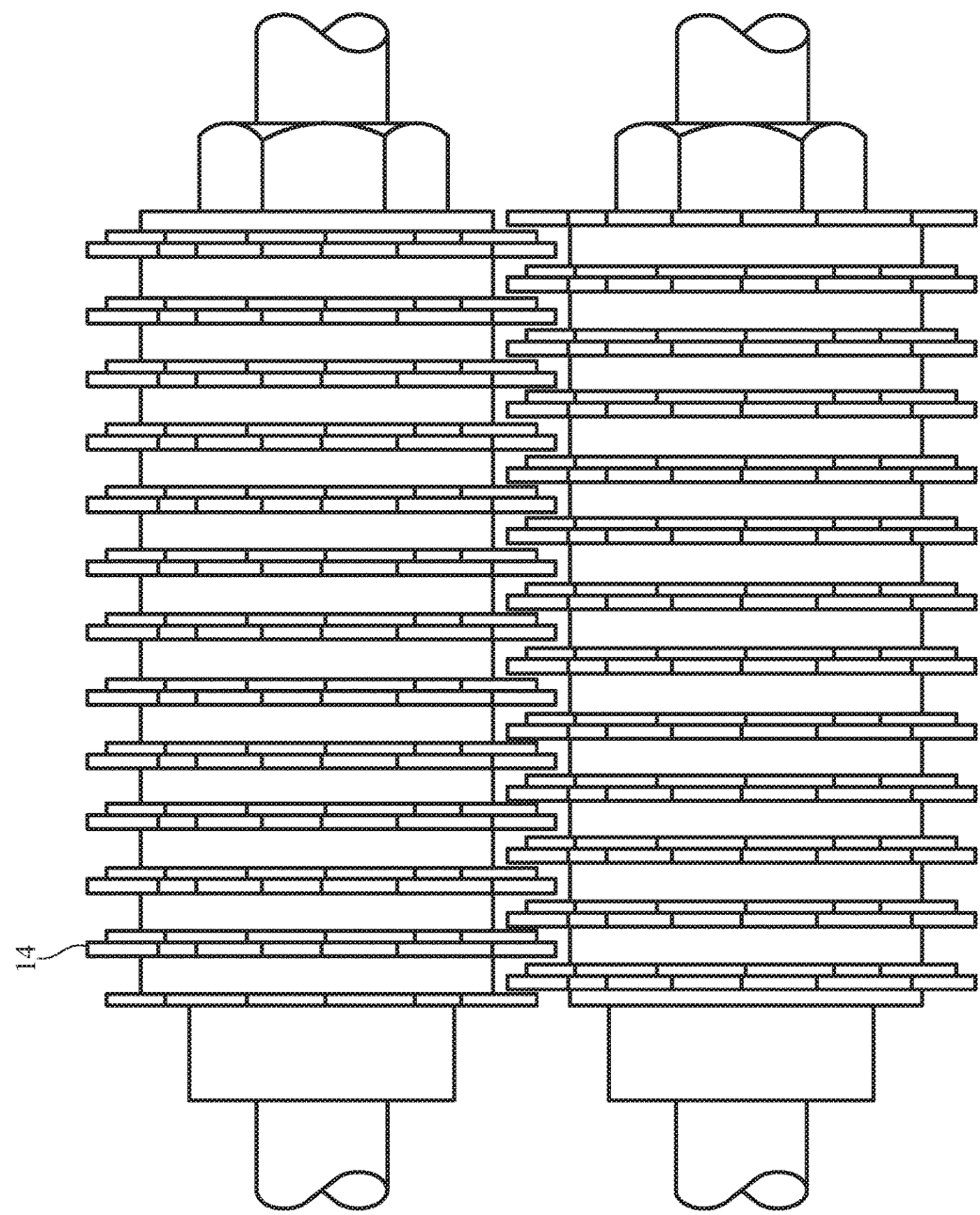
FIG. 4 is a top view of the shredder of FIG. 3.

FIG. 3 is a cross-sectional elevation view of a vessel with a shredder at 300 that may be used in one embodiment of the present invention. The view includes a pump and check-valve that are not in cross-section. FIG. 4 is a top view of the shredder of FIG. 3. In this embodiment, the waste stream to be treated is a blackwater stream. The blackwater stream has a liquid component consisting of water and urea. The blackwater stream has a solids component consisting of fecal matter, paper products, and hygiene products. The blackwater stream 40 passes through a check valve 12 that prevents backflow and into a vessel 10. The vessel 10 has a shredder 14 in a bottom portion that shreds the solids component into smaller particles. The partially-shredded blackwater stream 44 is pumped by pump 16 back into the vessel 10, the blackwater stream 42 is thereby forced by pressure through the shredder 14. Recirculation shreds the blackwater solids to a size threshold low enough to allow the sized solids component to spray through a nozzle with the liquids component. Particle size camera 15 mounted to a window 17 in a side of the vessel 10 is used to determine that the size threshold has been reached.

Figure 5:
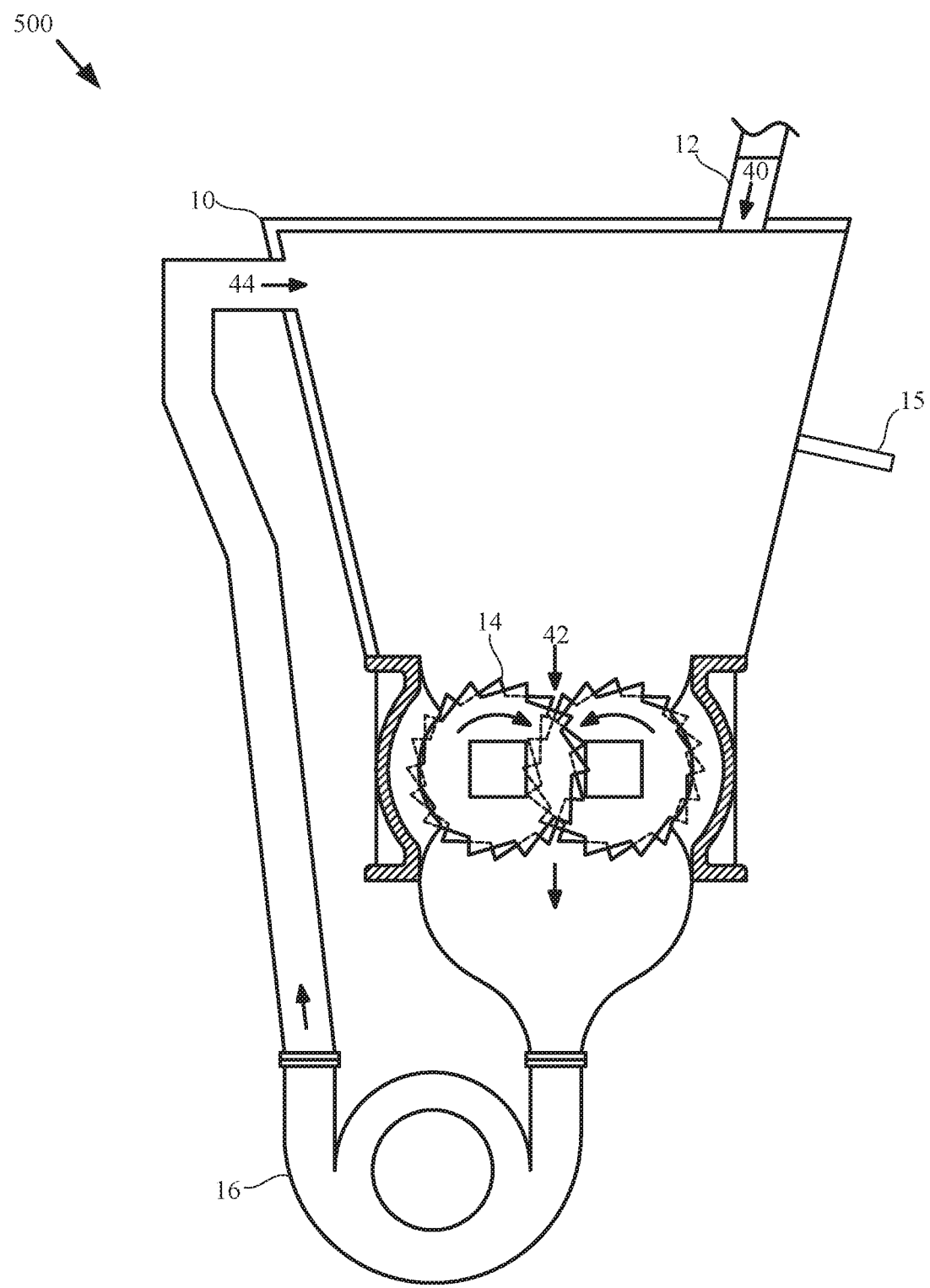
FIG. 5 is a cross-sectional elevation view of a vessel with a shredder.
Figure 6:
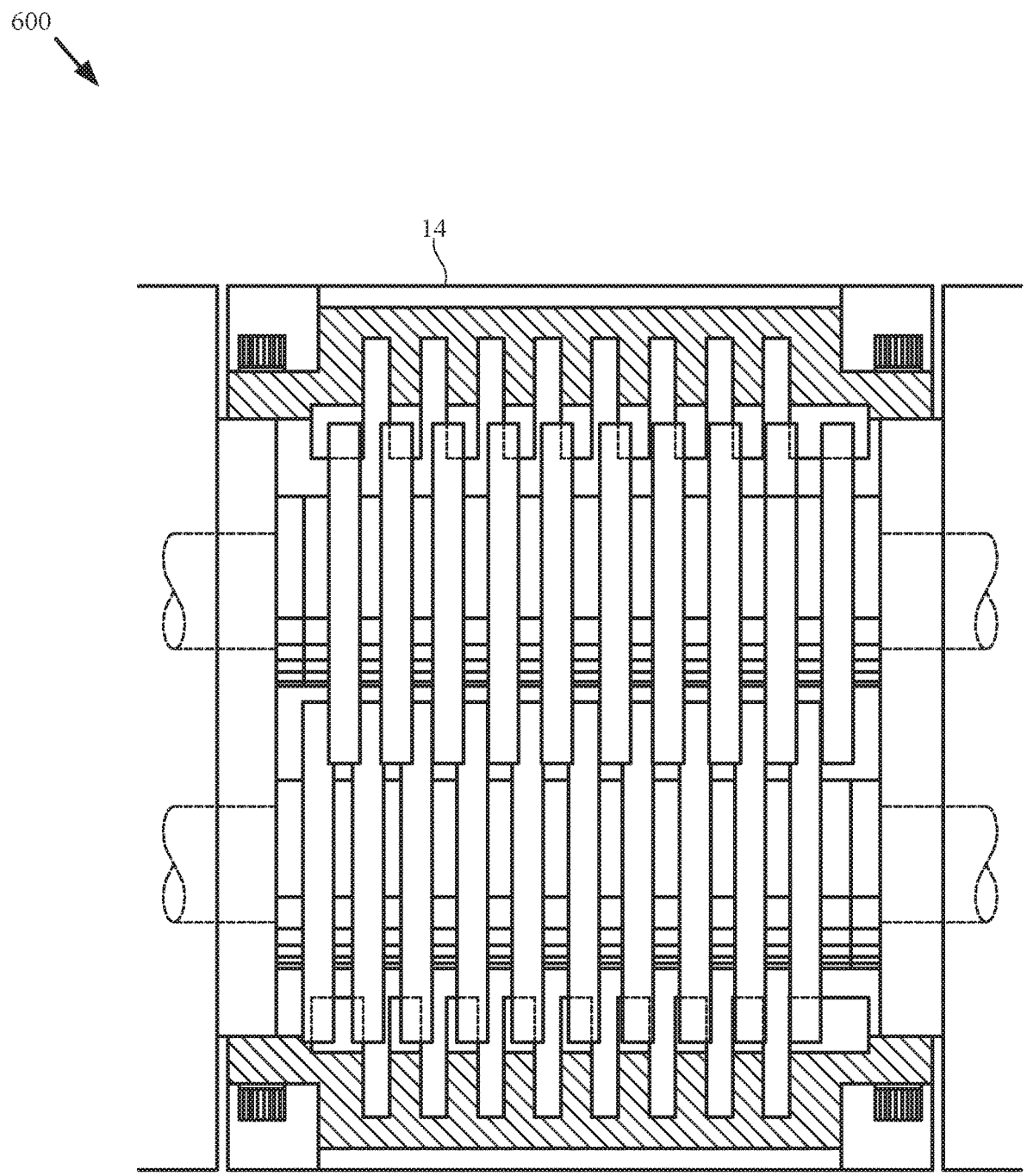
FIG. 6 is a top view of the shredder of FIG. 5.

FIG. 5 is a cross-sectional elevation view of a vessel with a shredder at 500 that may be used in one embodiment of the present invention. The view includes a pump and check-valve that are not in cross-section. FIG. 6 is a top view of the shredder of FIG. 5. In this embodiment, the waste stream to be treated is food waste. The waste stream has a liquid component consisting of water. The waste stream has a solids component consisting of pieces of food. The waste stream 40 passes through a check valve 12 that prevents backflow and into a vessel 10. The vessel 10 has a shredder 14 in a bottom portion that shreds the solids component into smaller particles. The partially-shredded waste stream 44 is pumped by pump 16 back into the vessel 10, the blackwater stream 42 is thereby forced by pressure through the shredder 14. Recirculation shreds the blackwater solids to a size threshold low enough to allow the sized solids component to spray through a nozzle with the liquids component. Particle size laser system 15 mounted to a side of the vessel 10 is used to determine that the size threshold has been reached.

The device for comminuting the solids may be selected from the group consisting of, but not limited to, grinders, grinding rolls, mills, shredders, macerators, crushers, and pulverizers.

In an alternative embodiment, the sized blackwater stream is passed into a bioreactor for traditional waste treatment rather than incineration.

In some embodiments, a water system is provided that provides water to prime the recirculating pump when the system is first started and the blackwater stream is not yet introduced.

The invention has been described with reference to various specific and preferred embodiments and techniques. Nevertheless, it is understood that many variations and modifications may be made while remaining within the spirit and scope of the invention.

What is claimed is:

1. A system for reducing an average particle size of waste solids, comprising:

a vessel configured to receive a waste stream through a one-way inlet, the one way inlet configured to allow the waste stream into the vessel and prevent backflow, wherein the waste stream comprises waste solids and water;

a device in a bottom portion of the vessel configured to receive the waste stream and comminute the waste solids;

means for detecting that the average particle size of the waste solids is reduced below a size threshold, wherein the means for detecting comprises a controller and an amp meter, a recirculating pump configured to recirculate the waste stream under pressure through the device until the average particle size of the waste solids is reduced below the size threshold, resulting in a treated waste stream with sized waste solids, and wherein the means for detecting comprises a controller and an amp meter, wherein the amp meter is configured to measure a current draw of the recirculating pump and transmit the current draw to the controller, wherein the controller is configured to detect a drop in the current draw, said drop indicating to the controller that the average particle size of the waste solids is reduced below the size threshold.

2. The invention of claim 1, wherein the means for detecting further comprises a camera to determine that the average particle size of the waste solids is reduced below the threshold.

3. The invention of claim 1, further comprising a transfer pump configured to draw the treated waste stream out of the vessel.

4. The invention of claim 3, further comprising an incinerator that receives and incinerated the treated waste stream.

5. The invention of claim 1 further comprising a preheater configured to preheat the waste stream in the vessel.

6. The invention of claim 1 further comprising a dewatering system that receives and dewaters the treated waste stream to form dewatered waste solids.

7. The invention of claim 6, further comprising an incinerator that receives and incinerates the dewatered waste solids.

8. The invention of claim 1, wherein the waste solids are selected from the group consisting of fecal matter, paper products, hygiene products, and combinations thereof.

9. The invention of claim 1, wherein the waste stream further comprises urea.

10. A method for reducing an average particle size of waste solids using the system of claim 1 comprising:
passing the waste stream into a vessel through the one-way inlet, the one-way inlet allowing the waste stream into the vessel and preventing backflow, wherein the waste stream comprises waste solids and water;
comminuting the waste solids through the device in the bottom portion of the vessel; and recirculating the waste stream through the recirculating pump under pressure through the device until the average particle size of the waste solids is reduced below the size threshold, resulting in the treated waste stream with sized waste solids.

11. The invention of claim 10 further comprising priming the recirculating pump with water.

12. The invention of claim 10 further comprising drawing the treated waste stream out of the vessel by a transfer pump.

13. The invention of claim 12 further comprising incinerating the treated waste stream with an incinerator.

14. The invention of claim 10 further comprising preheating the waste stream in the vessel.

15. The invention of claim 12 further comprising dewatering the treated waste stream with a dewatering system to form dewatered waste solids.

16. The invention of claim 15 further comprising incinerating the dewatered waste solids with an incinerator.

17. The invention of claim 10 further comprising measuring the current draw of the recirculating pump with the amp meter and transmitting the current draw to the controller, and further comprising detecting said drop in the current draw with the controller indicating the average particle size of the waste solids is reduced below the size threshold.

18. The invention of claim 10 wherein the waste solids are selected from the group consisting of fecal matter, toilet paper, hygiene products, and combinations thereof.

19. The invention of claim 10 wherein the waste stream further comprises urea.

* * * * *